United States Patent
Wong et al.

(10) Patent No.: US 9,465,413 B2
(45) Date of Patent: Oct. 11, 2016

(54) KEYBOARD CONFIGURATION FOR AN ELECTRONIC DEVICE

(71) Applicant: Intel Corporation, Santa Clara, CA (US)

(72) Inventors: Hong W. Wong, Portland, OR (US); Wah Yiu Kwong, Beaverton, OR (US); Murali Veeramoney, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 13/709,828

(22) Filed: Dec. 10, 2012

(65) Prior Publication Data
US 2014/0160653 A1    Jun. 12, 2014

(51) Int. Cl.
*G06F 1/16*    (2006.01)
*G06F 1/20*    (2006.01)

(52) U.S. Cl.
CPC ........... *G06F 1/1662* (2013.01); *G06F 1/1616* (2013.01); *G06F 1/1635* (2013.01); *G06F 1/1658* (2013.01); *G06F 1/1671* (2013.01); *G06F 1/203* (2013.01)

(58) Field of Classification Search
CPC ............................ G06F 1/1662; G06F 1/1671
USPC .......................................... 361/679.08–679.2
See application file for complete search history.

(56) References Cited

U.S. PATENT DOCUMENTS

| | | | | |
|---|---|---|---|---|
| 1,468,566 A | * | 9/1923 | Hall | 400/483 |
| 5,490,037 A | * | 2/1996 | Clancy | 361/679.55 |
| 5,543,787 A | * | 8/1996 | Karidis et al. | 341/20 |
| 5,598,469 A | * | 1/1997 | Preker | 379/433.07 |

(Continued)

FOREIGN PATENT DOCUMENTS

| | | |
|---|---|---|
| CN | 1601435 A | 3/2005 |
| CN | 101615076 A | 12/2009 |

(Continued)

OTHER PUBLICATIONS

International Search Report and Written Opinion received for International Application No. PCT/US2013/048297, mailed on Oct. 1, 2013, 8 pages.

(Continued)

*Primary Examiner* — Adrian S Wilson
(74) *Attorney, Agent, or Firm* — Patent Capital Group

(57) ABSTRACT

Particular embodiments described herein provide for an electronic device, such as a notebook computer or laptop, that includes including a base portion and a keyboard assembly at least partially disposed in the base portion. The keyboard assembly may include a first portion having at least a first key of a first thickness, and a second portion having at least a second key of a second thickness. The first thickness is different than the second thickness. In a particular embodiment, the first thickness is less than the second thickness. In a particular embodiment, the first portion includes a key row of the keyboard assembly. In still another more particular embodiment, the first portion is a top key row of the keyboard assembly. In still another more particular embodiment, the first portion is a bottom key row of the keyboard assembly. In particular embodiments, a reduced thickness of the first portion may provide for additional space within the base portion to allow other components to be located therein.

17 Claims, 6 Drawing Sheets

(56) References Cited

U.S. PATENT DOCUMENTS

| | | | |
|---|---|---|---|
| 5,610,602 A * | 3/1997 | Hargreaves | 341/22 |
| 5,625,532 A | 4/1997 | Sellers | |
| 5,768,093 A | 6/1998 | Howell et al. | |
| 5,774,384 A * | 6/1998 | Okaya et al. | 345/169 |
| 5,808,861 A * | 9/1998 | Nakajima et al. | 361/679.27 |
| 6,056,457 A | 5/2000 | Chao | |
| 6,064,564 A * | 5/2000 | Song et al. | 361/679.09 |
| 6,314,274 B1 * | 11/2001 | Kumagai | 455/90.3 |
| 6,604,877 B2 * | 8/2003 | Cheng | 400/472 |
| 6,729,783 B2 * | 5/2004 | Godsted et al. | 400/682 |
| 6,940,490 B1 * | 9/2005 | Kim et al. | 345/168 |
| 7,149,079 B2 * | 12/2006 | Kusamoto et al. | 361/679.4 |
| 7,182,533 B1 * | 2/2007 | Caplan | 400/489 |
| 7,741,570 B2 * | 6/2010 | Yurochko et al. | 200/5 A |
| 8,092,107 B2 * | 1/2012 | Cong et al. | 400/488 |
| 8,100,594 B2 * | 1/2012 | Chaumont et al. | 400/472 |
| 8,162,552 B2 * | 4/2012 | Rak et al. | 400/490 |
| 8,238,084 B2 * | 8/2012 | Chen et al. | 361/679.14 |
| 8,699,214 B2 * | 4/2014 | Sakuma | 361/679.08 |
| 2002/0110238 A1 * | 8/2002 | Kiernan | 379/433.07 |
| 2003/0213683 A1 * | 11/2003 | Shimizu et al. | 200/341 |
| 2004/0080899 A1 * | 4/2004 | Hill et al. | 361/680 |
| 2005/0068719 A1 | 3/2005 | Kusamoto et al. | |
| 2005/0174338 A1 * | 8/2005 | Ing et al. | 345/177 |
| 2009/0195507 A1 * | 8/2009 | Fujino et al. | 345/168 |
| 2010/0321872 A1 * | 12/2010 | Sip et al. | 361/679.2 |
| 2011/0260978 A1 * | 10/2011 | Larsen | 345/168 |
| 2012/0012448 A1 * | 1/2012 | Pance et al. | 200/5 A |
| 2012/0068933 A1 * | 3/2012 | Larsen | 345/168 |
| 2012/0295236 A1 * | 11/2012 | Miller | 434/227 |
| 2013/0222254 A1 * | 8/2013 | Tang et al. | 345/169 |

FOREIGN PATENT DOCUMENTS

| | | |
|---|---|---|
| KR | 100395240 B1 | 8/2003 |
| WO | 2010/133864 A2 | 11/2010 |
| WO | WO 2014/092798 A1 | 6/2014 |

OTHER PUBLICATIONS

Examination Opinion and Search Report in TW Application No. 102140270, mailed on Dec. 2, 2015, English translation, 4 pages.

Office Action in CN Application No. 201380004610.2, mailed on Mar. 31, 2016, English translation, 20 pages.

Feb. 25, 2015 Search Report in ROC Application No. 102140270, English translation, 1 page.

International Preliminary Report on Patentability received for International Application No. PCT/US2013/048297, mailed on Jun. 25, 2015, 7 pages.

* cited by examiner

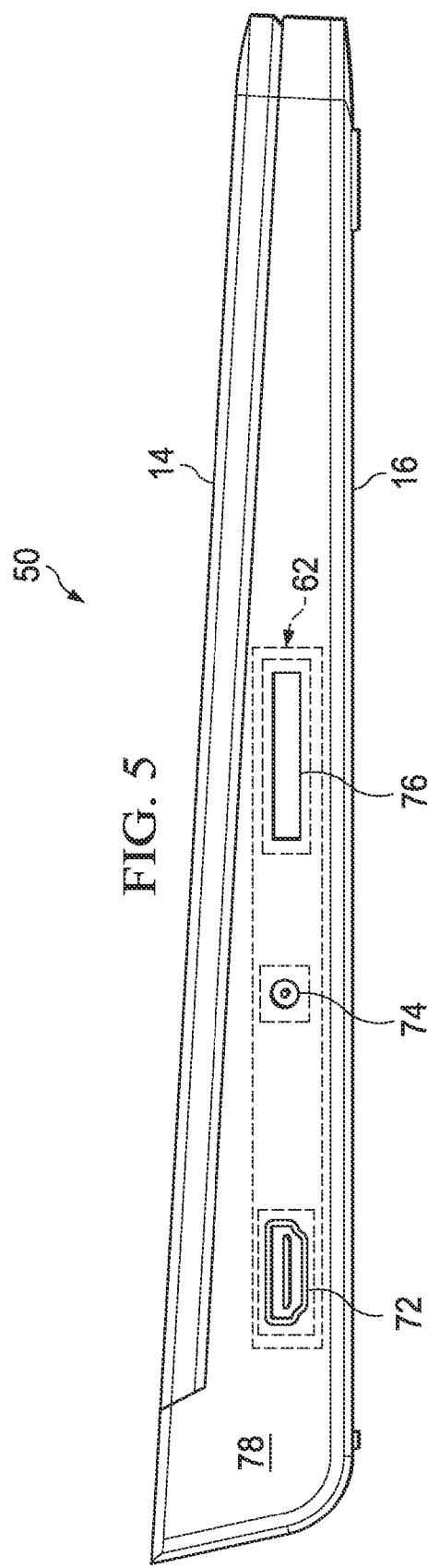

KEYBOARD CONFIGURATION FOR AN ELECTRONIC DEVICE

TECHNICAL FIELD

Embodiments described herein generally relate to keyboard configurations for an electronic device.

BRIEF DESCRIPTION OF THE DRAWINGS

Embodiments are illustrated by way of example and not by way of limitation in the FIGURES of the accompanying drawings, in which like references indicate similar elements and in which:

FIG. 5 is a simplified schematic diagram illustrating a side view of the electronic device of FIG. 4 in a closed configuration.

Figure 1:
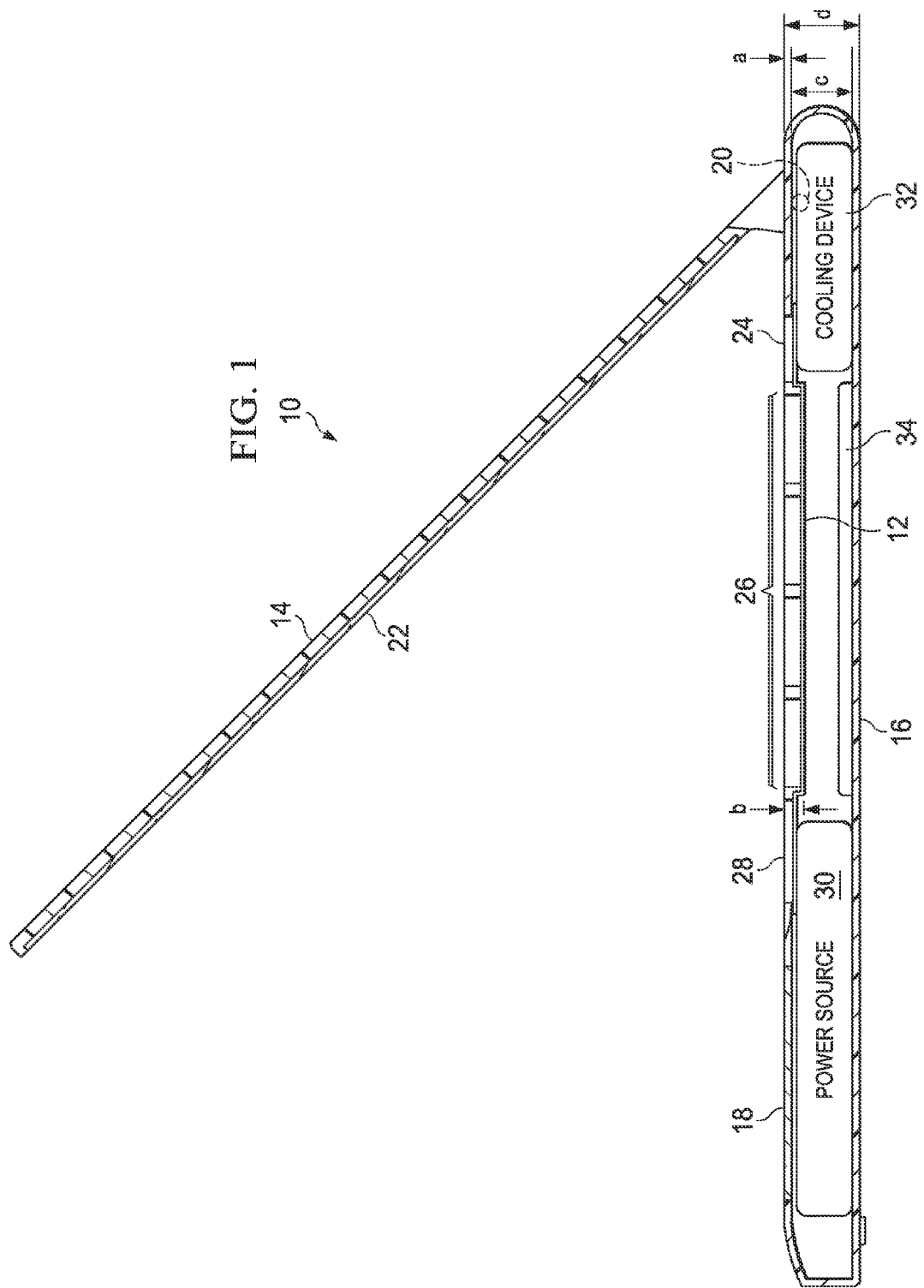
FIG. 1 is a simplified cross-sectional diagram illustrating an embodiment of an electronic device in a partially open configuration in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

The following detailed description sets forth example embodiments of apparatuses, methods, and systems relating to hinge configurations for an electronic device. Features such as structure(s), function(s), and/or characteristic(s), for example, are described with reference to one embodiment as a matter of convenience; various embodiments may be implemented with any suitable one or more of the described features.

Traditional electronic devices (e.g., laptops, notebook computers, etc.) follow design considerations in which a keyboard is generally positioned in a central portion of a chassis, a battery and touchpad are positioned in a front portion of the chassis, and electronics and thermal solutions are generally positioned in a rear portion of the chassis. However, these electronic devices are increasingly trending towards designs in which larger touchpads are desired. As a result, the keyboard is pushed towards the rear of the chassis and space for the electronics and/or thermal solution is reduced. Often the electrical, mechanical, and thermal components of the electronic device have to overlap and/or underlap the keyboard. As a result either an increase in the height and/or thickness of the electronic device is required and/or smaller less-capable components may have to be used which may have undesirable effects. For example, the use of smaller and/or dual cooling fans may result in an increase in cost, power, and acoustical noise. In addition, it may limit thermal headroom, for example, to support "turbo" modes of the electronic device.

Particular embodiments described herein include an electronic device, such as a laptop or notebook, including a base portion and a keyboard assembly at least partially disposed in the base portion. The keyboard assembly may include a first portion having at least a first key of a first thickness, and a second portion having at least a second key of a second thickness.

In more particular embodiments, the first thickness is less than the second thickness. In other particular embodiments, the first portion includes a key row of the keyboard assembly. In still more particular embodiments, the first portion of the keyboard assembly includes a top key row of the keyboard assembly. In other particular embodiments, the first portion of the keyboard assembly includes a bottom key row of the keyboard assembly.

In other particular embodiments, the first key has a first key travel distance and the second key has a second key travel distance, the first key travel distance being less than the second key travel distance. In still other particular embodiments, the first key is configured using a first key switch technology and the second key is configured using a second key switch technology. In particular embodiments, the first key switch technology is different than the second key switch technology.

In some embodiments, an interior space is formed within the base portion between the first portion and bottom portion of the base portion, and may include at least one component having at least a portion of the at least one component disposed within the interior space. In particular embodiments, the at least one component may include a power source, a cooling device, a portion of an input/output interface. In some embodiments, the at least one component is dimensioned to fit under the first portion but not the second portion of the keyboard assembly. In some embodiments, the interior space defines a speaker cavity.

In still other particular embodiments, the electronic device may include a lid portion coupled to the base portion. Keyboard Configuration for an Electronic Device FIG. 1 is a simplified cross-sectional diagram illustrating an embodiment of an electronic device 10 in a partially open configuration in accordance with one embodiment of the present disclosure. Electronic device 10 may include a keyboard assembly 12, a lid portion 14, a base portion 16, a touchpad 18, one or more hinges 20, and a display 22. Display 22 may be disposed within/on and/or supported by lid portion 14. In a particular embodiment, touchpad 18 is a pointing device that features a tactile sensor, a specialized surface that can translate the motion and position of a user's fingers to a relative position on screen. Touchpad 18 can be used in place of a mouse (e.g., where desk space is scarce or based on user preference). Touchpad 18 can operate using capacitive sensing, conductance sensing, or any other appropriate sensing technology. In one or more embodiments, display 22 is a screen that can be a liquid crystal display (LCD) display screen, a light-emitting diode (LED) display screen, an organic light-emitting diode (OLED) display screen, a plasma display screen, or any other suitable display screen system. In a particular embodiment, display 22 may include a touch pad disposed thereon.

In one or more embodiments, electronic device 10 is a notebook computer or laptop computer. In still other embodiments, electronic device 10 may be any suitable electronic device having a display such as a mobile device, a tablet computer and/or a tablet device (e.g., an i-Pad), a personal digital assistant (PDA), a smartphone, etc.

Hinge(s) 20 of electronic device 10 may be positioned between base portion 16 and lid portion 14. Hinge(s) 20 can define an axis of rotation that is shared between base portion 16 and lid portion 14. In one embodiment, base portion 16 and lid portion 14 are hingedly coupled via hinge(s) 20 in a clamshell configuration.

Keyboard assembly 12 of electronic device 10 may further include a keyboard configuration of a first key row portion 24, a second key row portion 26, and a third key row portion 28. In one embodiment, first key row portion 24 may include one or more keys of a top row of keyboard assembly 12. In another embodiment, third key row portion 28 may include one or more keys of a bottom row of keyboard assembly 12. In still another embodiment, second key row portion 26 may include one or more rows of keys disposed between the top row of keys and the bottom row of keys of keyboard assembly 12. In the particular embodiment illustrated in FIG. 1, second key row portion 26 includes four rows of keys. In still other embodiments, first key row portion 24 and/or third key row portion may include one or more keys of multiple rows of keyboard assembly 12.

Electronic device 10 may further include a power source 30 disposed within a front portion of base portion 16. In at least one embodiment, a portion of power source 30 is disposed below third key row portion 28. In a particular embodiment, power source 30 includes a battery although in other embodiments power source 30 may include any suitable power source for electronic device 10. Electronic device 10 may further include a cooling device 32 disposed within a rear portion of base portion 16. In at least one embodiment, a portion of cooling device 32 is disposed below first key row portion 24. In a particular embodiment, cooling device 32 includes one or more cooling fans. In still other embodiment, cooling device 32 may include any other suitable thermal management device such as a heat pipe and/or head spreader.

Electronic device 10 may further include a motherboard 34 positioned within base portion 16. In one example embodiment, motherboard 34 is a general circuit board that can hold various components of the internal electronic system of electronic device 10. The components may include a central processing unit (CPU), a memory, etc. Motherboard 34 can also couple to one or more connectors in order to accommodate other peripherals sought to be used by a user of electronic device 10. Any processors (inclusive of digital signal processors, microprocessors, supporting chipsets, etc.), memory elements, etc. can be suitably coupled to motherboard 34 based on particular configuration needs, processing demands, computer designs, etc. Other components such as external storage, controllers for video display, sound, and peripheral devices may be attached to motherboard 34 as plug-in cards, via cables, or integrated into the motherboard itself.

In at least one embodiment, the keys of first key row portion 24 are configured to be of a reduced thickness a (and/or height) in comparison to a thickness b (and/or height) of the keys of second key row portion 26. In another embodiment, the keys of third key row portion 28 are also of reduced thickness a (and/or height) with respect to thickness b of the keys of second key row portion 26. In still other embodiments, the thickness of the keys of first key row portion 24, second key row portion 26, and third key row portion 28 may each be of a different thickness and/or different key travel with respect to one another.

In a particular embodiment, first key row portion 24 and third key row portion 28 have a thickness a equal to approximately two millimeters (2 mm), and second key row portion 26 has a thickness b equal to approximately 3.6 mm. In still another particular embodiment, first key row portion 24 and/or third key row portion 28 may have a thickness a in the range of 1 mm to 3 mm, and second key row portion 26 may have a thickness b in the range of 3 mm to 5 mm. In still another particular embodiment, cooling device 32 has a thickness c equal to approximately 6 mm. In still another particular embodiment, base portion 16 may have a thickness d of approximately 9 mm.

In accordance with at least one embodiment, the keys of first key row portion 24 being of a reduced thickness with respect to the keys of second key row portion 26 may result in the keys of first key row portion 24 having a reduced key travel with respect to a key travel of the keys of second key row portion 26. Similarly, the keys of third key row portion 28 may have a reduced key travel with respect to the keys of second key row portion 26.

In various embodiments, the key switch technology used in keys of first key row portion 24 and/or third key row portion 28 may be different than that of the keys of second key row portion 26 in order to achieve the reduced thickness and/or key travel of first key row portion 24 and/or third key row portion 28 with respect to the thickness and/or key travel of second key row portion 26. In at least one embodiment, the first key row portion 24 and/or third key row portion 28 may be configured using a first key switch technology, and second key row technology 26 may be configured using a second key switch technology. In a particular embodiment, the first key switch technology may be different than the second key switch technology. For example, in a particular embodiment second key row portion 24 may use a scissor-type key switch technology and one or more of first key row portion 24 and/or third key row portion 28 may use a reduced profile switch technology such as a membrane-based key switch, a dome key switch, a capacitive key switch, an optical key switch, or an OLED display strip having a touch sensor on a top surface thereof. In other embodiments, the first key switch technology may be the same as the second key switch technology. In still other embodiments, first key row portion 24 and/or third key row portion 28 may use any other suitable low-profile keyboard switch technologies with respect to the key switch technologies used for second key row portion 26. In a particular embodiment in which one or both of first key row portion 24 and third key row portion 28 are configured as an OLED display strip with touch sensor on the top surface thereof the row of keys are configured to be programmable such that keys may be, for example, redefined per an application that is running on electronic device 10 or used as a display to indicate the current function of the particular key.

One consideration for the design of keyboard configurations for electronic devices such as notebooks or laptops is that of key travel. In some instances it is desired to have a minimum key travel of approximately 1.5-1.6 mm. This may result in traditional keyboards for some electronic devices such as an ultrabook having a total thickness of approximately 3.5 mm to 3.6 mm. According to various embodiments, certain portions of keyboard 26, such as first key row portion 24 and third key row portion 28, of electronic device 10 are reduced in thickness with respect to second key row portion 26 which may result in a corresponding reduction in key travel in comparison to the key travel for second key row portion 26. By reducing the key height of certain portions of keyboard assembly 12, such as first key row portion 24 and third key row portion 28, additional interior space may be gained within base portion 16 below first key row portion 24 and third key row portion 28 to allow placement of components and/or to reduce overall system thickness. In at least one embodiment, the interior space is formed in base portion 16 between first key row portion 24 and/or third key row portion 28 and a bottom portion of base portion 16.

In various embodiments, the reduction in key travel does not result in a reduced user experience when a user is typing with keyboard assembly 12. Regarding first key row portion 24, in some embodiments most or all of the keys of the upper row of keyboard assembly 12 (such as scroll, pause, function keys, etc.) are seldom used during typing by a user. Regarding, the third key row portion 28, many keys of the lower row of keyboard assembly 12, such as the ALT key or CTRL key, are often not used with as much frequency or in the same way as the keys of second key row portion 26 during typical typing by a user. Although, the Space key is used with some frequency, the space key is typically pressed by the thumb of the user which is a different motion than that employed by the other fingers of the user's hand when typing. Thus, in some embodiments, the Space key may be configured as a reduced thickness key with minimal impact on the user experience. Accordingly, in some embodiments, third key row portion 28, as well as first key row portion 24, may be configured with keys having a thinner dimension with respect to second key row portion 26. This allows certain areas, portions or regions of keyboard assembly 12 to be thinner with respect to other portions an may allow a system designer to use the extra internal space for component placement to reduce the overall system thickness or to incorporate more or larger system components. In various embodiments, reducing the key travel of such keys has no or a minimal impact to the user experience of using keyboard assembly 12.

Although the embodiment of FIG. 1 is illustrated as having both first key row portion 24 and third key row portion 28 having keys of reduced thickness, it should be understood that in still other embodiments only one of first key row portion 24 and third key row portion 28 may be of reduced thickness. In addition, although the embodiment illustrated in FIG. 1 includes first key row portion 24 and third key row portion 28 including keys of reduced thickness, it should be understood that in other embodiments any one or more of the other keys of keyboard assembly 12 may be configured as keys of reduced thickness in order to accommodate the placement of components within base portion 16 and/or to reduce the thickness of base portion 16. In some embodiments, a component may be dimensioned to fit under the portion of the keyboard assembly 12 having keys or reduced thickness but not the portion of the keyboard assembly 12 having keys that are not of reduced thickness.

Figure 2:
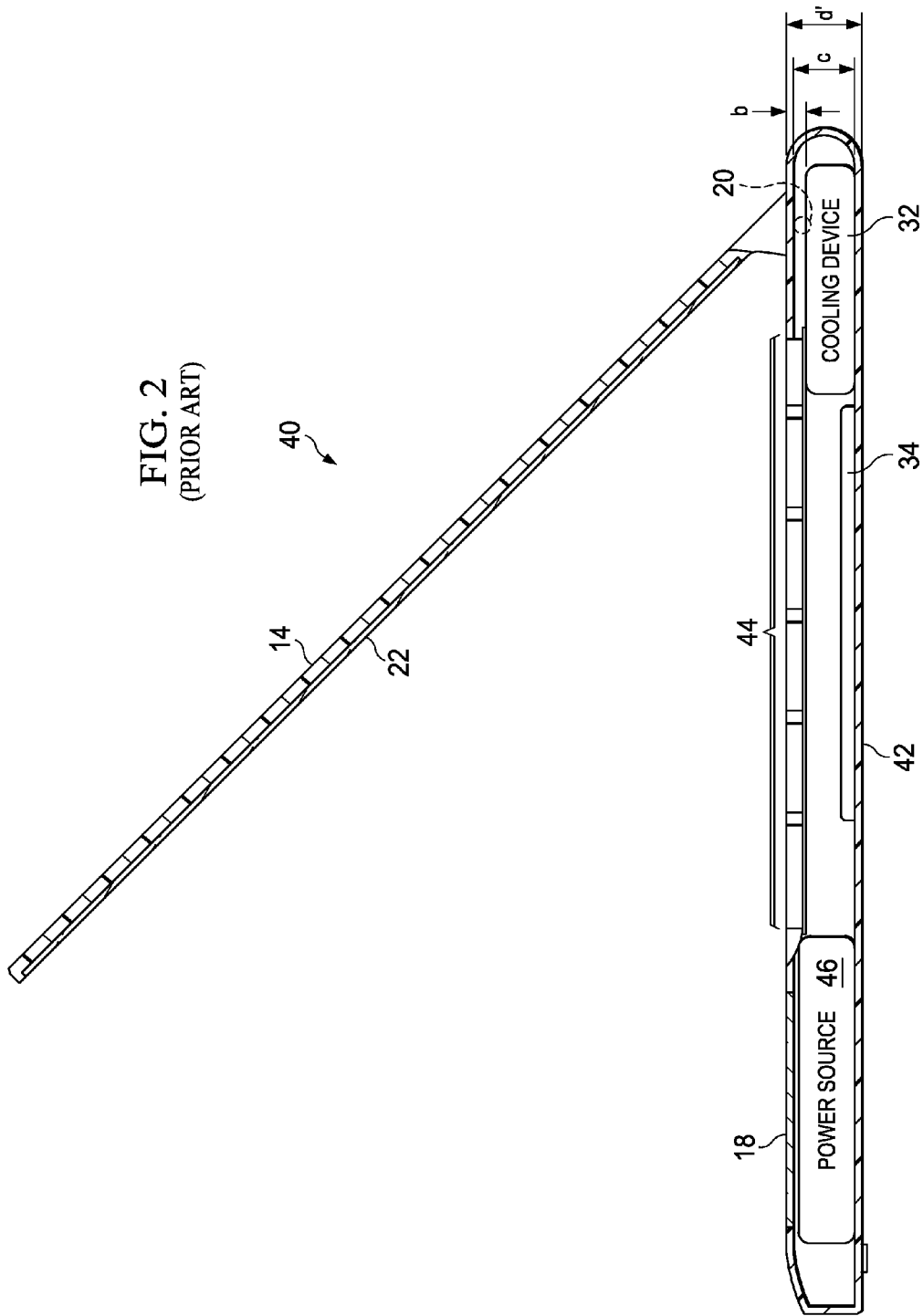
FIG. 2 is a simplified cross-sectional diagram illustrating a traditional electronic device in a partially open configuration that does not use the keyboard configuration of the various embodiments of the present disclosure.

FIG. 2 is a simplified cross-sectional diagram illustrating a traditional electronic device 40 in a partially open configuration that does not use the keyboard configuration of the various embodiments of the present disclosure. Electronic device 40 may include lid portion 14, touchpad 18, hinge 20, display 22 (which may include a touchscreen), cooling device 32 and motherboard 34 as described with respect to FIG. 1. In contrast to electronic device 10 of FIG. 1, electronic device 40 includes a base portion 42 having a thickness that is greater than that of base portion 16 of electronic device 40. Electronic device 40 further includes a keyboard 44 in which each row of keys are of equal thickness. In a particular example, the keys of keyboard 44 are approximately equal to that of second key row portion 26 of electronic device 10, having a thickness of b. Base portion 42 of electronic device 40 has a thickness d'. In a particular example, base portion 42 has a thickness equal to approximately 10.6 mm. As can be seen in FIG. 2, electronic device 40 is thicker than that of electronic device 10 of FIG. 1 and does not make adequate use of the interior space of base portion 42. In addition, electronic device 40 has a power source 46, which may include a battery, that is constrained in size by a lower portion of keyboard 40 resulting in less battery capacity.

Figure 3A:
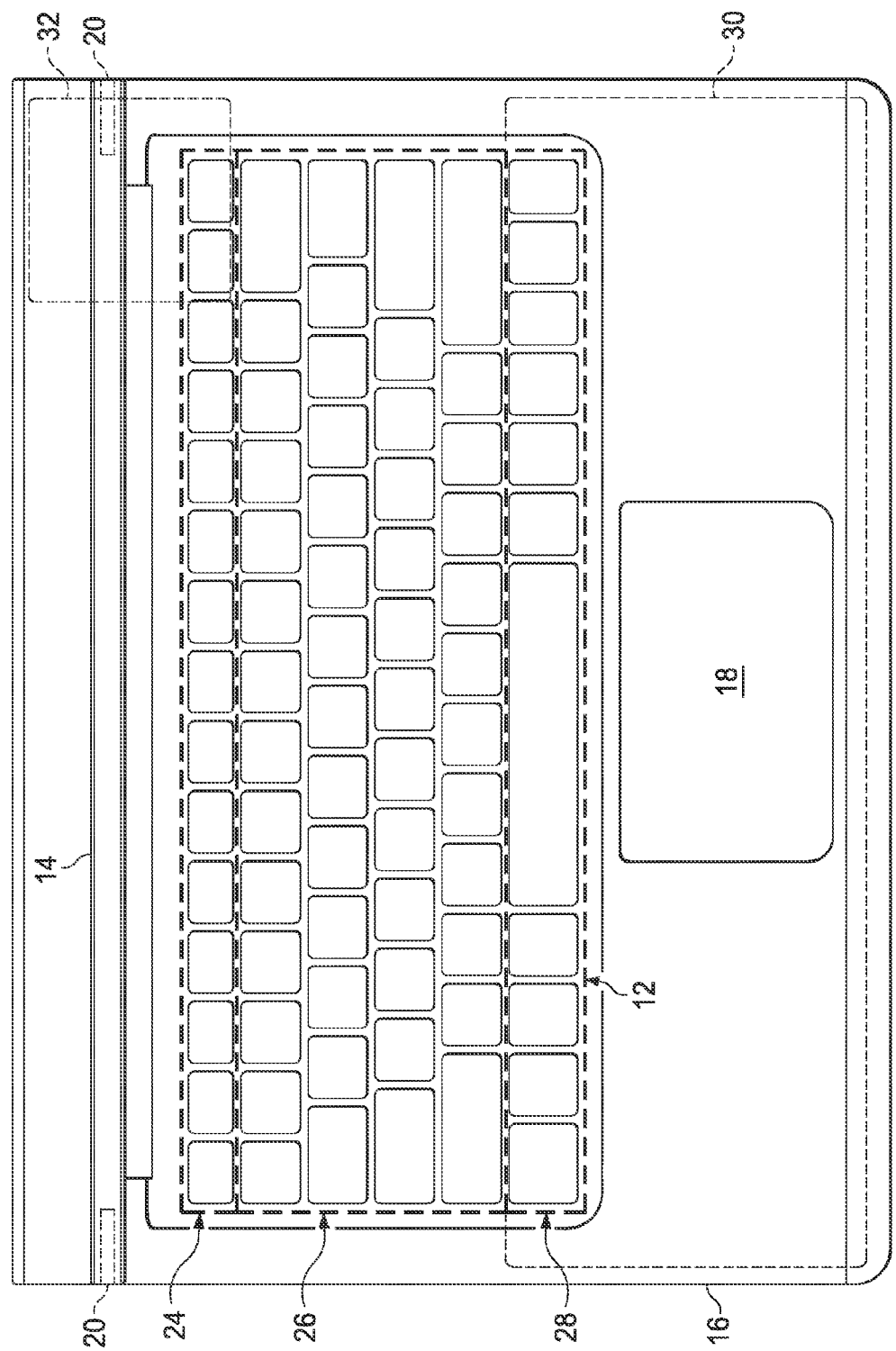
FIG. 3A is a simplified schematic diagram illustrating a top view of one example embodiment of the electronic device of FIG. 1.
Figure 3B:
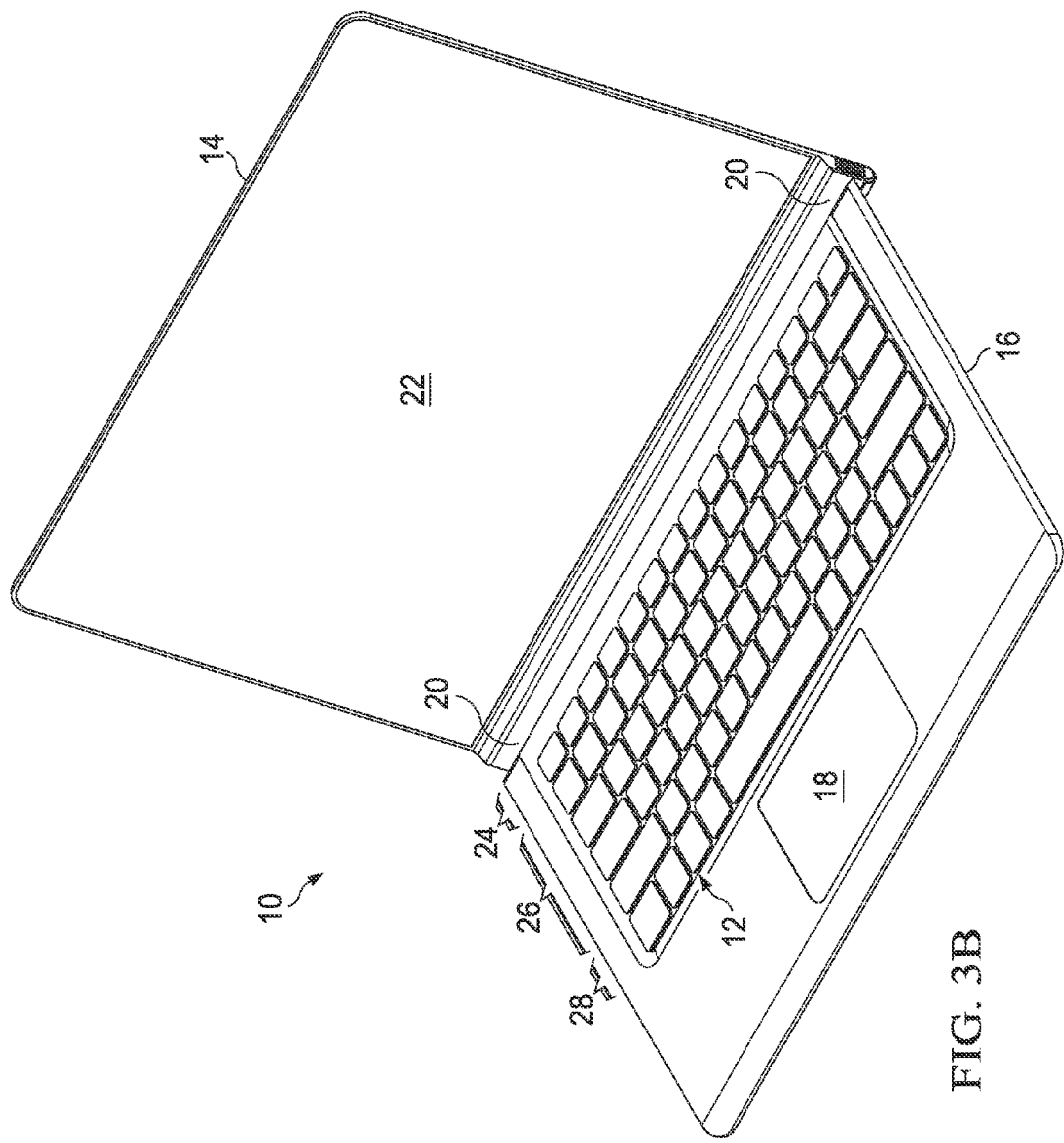
FIG. 3B is a simplified schematic diagram illustrating an orthogonal view of the electronic device of FIG. 1.

FIG. 3A is a simplified schematic diagram illustrating a top view of one example embodiment of electronic device 10 of FIG. 1. FIG. 3B is a simplified schematic diagram illustrating an orthogonal view of electronic device 10 of FIG. 1. In the example embodiment of FIGS. 3A-3B, first key row portion 24 includes the top row of keys of keyboard assembly 12. Each of the keys of first key row portion 24 is of a reduced thickness and key travel with respect to the keys of second key row portion 26. As shown in FIG. 3A, cooling device 32 is disposed under a portion of the keys of first key row portion 24 allowing better utilization of the interior space of the rear portion of base portion 16. In various embodiments, the extra interior space gained by the utilization of thinner keys for first key row portion 24 allows for greater accommodation for the placement of components within base portion 16 such as thermal cooling solutions, system memory, electronic modules and any other suitable components of electronic device 10.

As further shown in FIGS. 3A-3B, third key row portion 24 includes the bottom row of the keys of keyboard assembly 12. In the example embodiment of FIGS. 3A-3B, each of the keys of third key row portion 28 is of reduced thickness and key travel with respect to the keys of second key row portion 26. As shown in FIG. 3A, a portion of power source 30 is disposed under a portion of the keys of third key row portion 28. In various embodiments, the extra interior space gained by the utilization of thinner keys for third key row portion 28 allows for greater accommodation for the placement of components within the front portion of base portion 16.

For example, in a particular embodiment of electronic device 10 in which display 22 is a 13.3" screen, the lower row of keyboard assembly 12 represented by third key row portion 28 may be reduced from 3.6 mm to 2 mm. Such a reduction in the thickness of third key row portion 28 of keyboard assembly 12 may result in a gain of internal volume of 300×15×1.5 mm. Such a gain in internal volume allows for a gain in battery capacity of power source 30 of three (3) watt-hr (WHr) resulting in a significant gain in battery life before recharging of electronic device 10 is required.

In a particular embodiment, by using a different key switch technology instead of the common scissor-type for the keys of reduced thickness of keyboard assembly 12, the keyboard thickness of first key row portion 24 at the top row of keyboard assembly 12 may be approx. 1.5 mm-2 mm. In a particular embodiment, the keyboard thickness of keyboard assembly 12 of second key row portion 26 at the next four rows of keys of keyboard assembly 12 may be 3.5 mm-3.6 mm in order to meet the user's expectation of key travel. In a particular embodiment, the keyboard thickness of third key row portion 28 at the last/lower row of keyboard assembly 12 may be either 3.5 mm-3.6 mm, or alternately, may also be reduced as in the upper row to 1.5 mm-2 mm in thickness.

Figure 4:
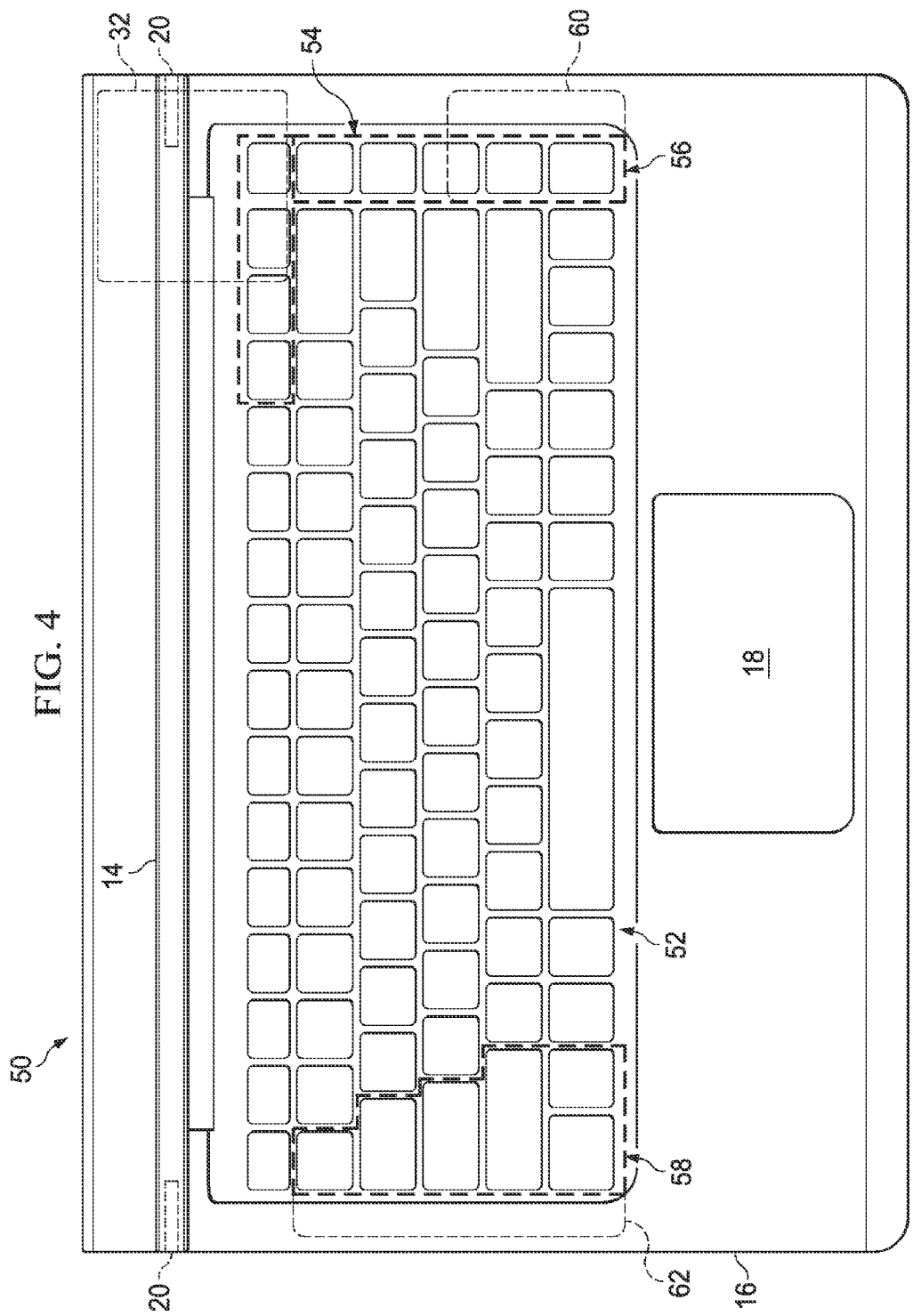
FIG. 4 is a simplified schematic diagram illustrating a top view of another embodiment of an electronic device.

FIG. 4 is a simplified schematic diagram illustrating a top view of another embodiment of an electronic device 50. Electronic device 50 is similar to that of electronic device 10. In contrast to keyboard assembly 12 of electronic device 10 which includes first key row portion 24 and third key row portion 28 having keys of reduced thickness, electronic device 50 includes a keyboard assembly 52 having a first reduced thickness portion 54, a second reduced thickness portion 56, and a third reduced thickness portion 58. The keys forming each of first reduced thickness portion 54, second reduced thickness portion 56, and third reduced thickness portion 58 of keyboard assembly 52 are of a reduced thickness (or height) with respect to the rest of the keys of keyboard assembly 52.

In the embodiment of electronic device 50 illustrated in FIG. 4, first reduced thickness portion 54 of keyboard assembly 52 is positioned on an upper right portion of keyboard assembly 52 and may include the four rightmost keys of the upper row of keyboard assembly 52. In a particular embodiment, the four rightmost keys of the upper row of keyboard assembly 52 may include, for example, a "pause" key, a "Prt Screen" key, a "Delete" key, and an "Insert" key. The interior space of base portion 16 below first reduced thickness portion 54 may accommodate one or more components of electronic device 50 such as cooling device 32.

Second reduced thickness portion 56 of keyboard assembly 52 is positioned on a right side of keyboard assembly 52 and may include four keys along the right side of keyboard assembly 52. In a particular embodiment, the four keys long the right side of keyboard assembly 52 may include, for example, a page up key, page down key, page right key, and page left key which may be configured of a reduced thickness and key travel with minimal impact on the user experience. The interior space of base portion 16 below and extending to the right of second reduced thickness portion 56 may include a right side internal volume 60.

Third reduced thickness portion 58 of keyboard assembly 52 is positioned on a left side of keyboard assembly 52 and may include a number of keys along the left side of keyboard assembly 52. In a particular embodiment, the keys along the left side of the keyboard may include, for example, a tab key, "caps lock" key, a shift key and a control key which may be configured to be of a reduced thickness with minimal impact on the user experience. The interior space of base portion 16 below and extending to the left of third reduced thickness portion 58 of keyboard assembly 52 may include a left side internal volume 62. Right side internal volume 60 and left side internal volume 62 may be configured to accommodate one or more components of electronic device 50 such as one or more input/output (I/O) connectors or interfaces, a removable disc drive, or any other component of electronic device 50 that may be positioned within right side internal volume 60 or left side internal volume 62.

In a particular embodiment, right side internal volume 60 and/or left side internal volume 62 may each be configured to include or define a speaker box or cavity coupled to one or more speakers. The speaker box or cavity may be configured to increase the volume of one or more speaker assemblies of electronic device 50 and thereby improve the audio quality of sound emitted by the speaker assemblies. For example, a cubic centimeter increase in volume may extend the frequency range of the speaker assemblies by 100 Hz, resulting in a substantial increase in speaker performance.

Although the embodiment of electronic device 50 of FIG. 4 shows that keyboard assembly 52 includes first reduced thickness portion 54, second reduced thickness portion 56, and third reduced thickness portion 58, it should be understood that in other embodiments any one or more of the keys of keyboard assembly 52 may be of reduced thickness and/or key travel.

FIG. 5 is a simplified schematic diagram illustrating a side view of electronic device 50 of FIG. 4 in a closed configuration. In the closed configuration, lid portion 14 and base portion 16 are placed in a folded position with respect to one another. In the side view of FIG. 4, base portion 16 includes I/O interfaces including a universal serial bus (USB) port 72, a headphone connector 74, and an secure digital (SD) memory card slot 62 disposed at least partially within left side interior volume 62. Because the keys of third reduced thickness portion 58 are configured to be of a reduced thickness, USB port 72, headphone connector 74, and SD memory slot 76 may be positioned within left side interior volume 62 instead of being required to be positioned within a rear portion 78 of base portion 16. This may be desirable in various embodiments because space within rear portion 78 is often at a premium. Freeing up this space by disposing components such as USB port 72, headphone connector 74, and SD memory slot 76 within left side interior volume 62 allows rear portion 78 to be used for the placement of other components such as electronic components or thermal management solutions.

Although the embodiments illustrated in FIGS. 1 and 3A-5 show that the keys of reduced thickness and key travel are part of keyboard assembly 12 and keyboard assembly 52, it should be understood that in other embodiments the keys of reduced thickness and/or key travel may be configured to be a part of a separate sectional design or separate assembly of electronic device 10 and electronic device 50, respectively.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. Any suitable length, width, and depth (or height) may be used and can be based on particular end user needs, or specific elements to be addressed by the apparatus (or the system in which it resides). The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

EXAMPLE EMBODIMENT IMPLEMENTATIONS

One particular example implementation may include an electronic device, such as a laptop or notebook, including a base portion and a keyboard assembly at least partially disposed in the base portion. The keyboard assembly may include a first portion having at least a first key of a first thickness, and a second portion having at least a second key of a second thickness. The first thickness is different than the second thickness. In a particular embodiment, the first thickness is less than the second thickness. In a particular implementation, the first portion includes a key row of the keyboard assembly. In a more particular implementation, the first portion is a top key row of the keyboard assembly. In still another more particular implementation, the first portion is a bottom key row of the keyboard assembly.

What is claimed is:

1. An electronic device, comprising:
    a base portion; and
    a keyboard assembly at least partially disposed in the base portion, the keyboard assembly including a first portion having at least a first key of a first thickness, and a second portion having at least a second key of a second thickness, the first thickness being less than the second thickness, wherein the first portion and the second portion are integrated as a single keyboard configuration, and wherein the first portion includes a first key row of the single keyboard configuration and the second portion includes a second key row of the single keyboard configuration, the first key row being adjacent to and parallel with the second key row;
    wherein the base portion includes a first interior space portion between the first portion of the keyboard assembly and a bottom portion of the base portion, and a second interior space portion between the second portion of the keyboard assembly and the bottom portion of the base portion;
    wherein the first interior space portion is dimensioned to allow placement of at least one component under the first portion of the keyboard assembly and the second interior space portion is dimensioned to not allow placement of the at least one component under the second portion of the keyboard assembly.

2. The electronic device of claim 1, wherein the first key row of the keyboard assembly includes a top key row of the keyboard assembly.

3. The electronic device of claim 1, wherein the first key row of the keyboard assembly includes a bottom key row of the keyboard assembly.

4. The electronic device of claim 1, wherein the first key has a first key travel distance and the second key has a second key travel distance, the first key travel distance being less than the second key travel distance.

5. The electronic device of claim 1, wherein the first key is configured using a first key switch technology and the second key is configured using a second key switch technology.

6. The electronic device of claim 5, wherein the first key switch technology is different than the second key switch technology.

7. The electronic device of claim 1, wherein the at least one component includes a power source.

8. The electronic device of claim 1, wherein the at least one component includes a cooling device.

9. The electronic device of claim 1, wherein the at least one component includes a portion of an input/output interface.

10. The electronic device of claim 1, wherein the first interior space portion defines a speaker cavity.

11. The electronic device of claim 1, further comprising a lid portion coupled to the base portion.

12. A keyboard assembly comprising:
    a first portion including at least a first key having a first thickness; and
    a second portion including at least a second key having a second thickness, the first thickness being less than the second thickness, wherein the first portion and the second portion are integrated as a single keyboard configuration, and wherein the first portion includes a first key row of the single keyboard configuration and the second portion includes a second key row of the single keyboard configuration, the first key row being adjacent to and parallel with the second key row;
    wherein the keyboard assembly is configured to be at least partially disposed in a base portion of an electronic device, wherein the base portion includes a first interior space portion between the first portion of the keyboard assembly and a bottom portion of the base portion, and a second interior space portion between the second portion of the keyboard assembly and the bottom portion of the base portion; and
    wherein the first interior space portion is dimensioned to allow placement of at least one component under the first portion of the keyboard assembly and the second interior space portion is dimensioned to not allow placement of the at least one component under the second portion of the keyboard assembly.

13. The keyboard assembly of claim 12, wherein the first key row of the keyboard assembly includes a top key row of the keyboard assembly.

14. The keyboard assembly of claim 12, wherein the first key row of the keyboard assembly includes a bottom key row of the keyboard assembly.

15. The keyboard assembly of claim 12, wherein the first key has a first key travel distance and the second key has a second key travel distance, the first key travel distance being less than the second key travel distance.

16. The keyboard assembly of claim 12, wherein the first key is configured using a first key switch technology and the second key is configured using a second key switch technology.

17. The keyboard assembly of claim 16, wherein the first key switch technology is different than the second key switch technology.

* * * * *